(12) United States Patent  
Murakami

(10) Patent No.: US 7,930,599 B2
(45) Date of Patent: Apr. 19, 2011

(54) INFORMATION PROCESSING APPARATUS AND FAULT PROCESSING METHOD

(75) Inventor: Hiroshi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/562,657

(22) Filed: Sep. 18, 2009

(65) Prior Publication Data
US 2010/0011257 A1 Jan. 14, 2010

Related U.S. Application Data

(63) Continuation of application No. PCT/JP2007/056957, filed on Mar. 29, 2007.

(51) Int. Cl.
G06F 11/00 (2006.01)

(52) U.S. Cl. ......................................................... 714/48
(58) Field of Classification Search ...................... 714/48
See application file for complete search history.

(56) References Cited

U.S. PATENT DOCUMENTS

| 7,260,752 | B2* | 8/2007 | Linam et al. ..................... 714/48 |
| 7,562,262 | B2* | 7/2009 | Kondajeri et al. ............... 714/48 |
| 2002/0032850 | A1* | 3/2002 | Kauffman ........................ 712/31 |
| 2002/0186711 | A1 | 12/2002 | Masuyama et al. |
| 2004/0153888 | A1 | 8/2004 | Kadoi |
| 2004/0230861 | A1 | 11/2004 | Bailey et al. |
| 2006/0250945 | A1* | 11/2006 | Fernandes et al. ............ 370/216 |
| 2008/0010559 | A1* | 1/2008 | Kondajeri et al. ............... 714/47 |
| 2008/0177974 | A1* | 7/2008 | Chiang et al. .................. 711/173 |
| 2010/0100776 | A1* | 4/2010 | Murakami ....................... 714/57 |

FOREIGN PATENT DOCUMENTS

| EP | 1 391 822 | 2/2004 |
| JP | 64-50135 | 2/1989 |
| JP | 2002-229811 | 8/2002 |
| JP | 2003-76671 | 3/2003 |
| JP | 2004-62535 | 2/2004 |
| JP | 2004-213178 | 7/2004 |
| JP | 2004-342109 | 12/2004 |
| JP | 2005-122229 | 5/2005 |

OTHER PUBLICATIONS

International Preliminary Report on Patentability, mailed Oct. 20, 2009, in corresponding International Application No. PCT/JP2007/056957 (4 pp.).

* cited by examiner

Primary Examiner — Bryce P Bonzo
(74) Attorney, Agent, or Firm — Staas & Halsey LLP

(57) ABSTRACT

An information processing apparatus includes: a hardware management unit that is connected with hardware resources assigned to a plurality of partitions and manages the hardware resources, and if occurrence of a fault in any of the plurality of partitions is detected, makes a notification of the occurrence of the fault in a fault-occurring partition which is the partition where the fault occurs; and a partition management unit that is provided in each partition and acquires fault information if in a physically partitioned state, if the occurrence of the fault is recognized based on the notification from the hardware management unit, if its own partition is not the fault-occurring partition, and if it is determined to be necessary to acquire the fault information, the fault information being information on the fault.

20 Claims, 4 Drawing Sheets

INFORMATION PROCESSING APPARATUS AND FAULT PROCESSING METHOD

CROSS-REFERENCE TO RELATED APPLICATIONS

This application is a continuation application, filed under 35 U.S.C. §111(a), of PCT Application No. PCT/JP2007/056957, filed Mar. 29, 2007, the disclosure of which is herein incorporated in its entirety by reference.

FIELD

The embodiment discussed herein is related to a an information processing apparatus and a fault processing method that are capable of performing physical partitioning so that hardware resources are divided and used in respective different partitions.

BACKGROUND

Servers running on mission-critical systems require high availability and flexible resource operation. For such requirements, ASICs (Application Specific Integrated Circuits) and firmware (hereinafter, F/W) provide a physical partitioning function of dividing resource allocations, which have conventionally been fixed to hardware (hereinafter, H/W) (such as a processor and a memory), into n partitions and using the same with respective different OSes (Operating Systems). Such a function enables flexible resource operation without H/W restrictions.

Functions for precise analysis and notification of fault information are required when using the physical partitioning function as well as when not. For that purpose, a fault-managing function is implemented along with a fault detection function equivalent to when not using the physical partitioning function. Possible methods for managing a fault when using the physical partitioning function are broadly classified into the following three.

(Management method 1) Implement all the functions of H/W resource allocation and information assignment on an ASIC.

(Management method 2) Implement the functions of H/W resource allocation and information assignment on an ASIC and via F/W in a cooperative manner depending on the respective characteristics.

(Management method 3) Implement all the functions of H/W resource allocation and information assignment via F/W. (=virtualization)

In consideration of reliability, implementation, cost, and adaptability to other functions, the following will deal with the management method 2 which has less impact on the partitions under a H/W fault and allows more flexible functional enhancements. Here, the ASIC manages H/W, partitions H/W resources, and provides resource management information including fault information to the F/W. The F/W analyses the resource management information as needed, and provides the fault information on the partitions to upper layers such as an OS.

Incidentally, the related techniques include a fault processing system in which fault processing apparatuses corresponding to respective first and second groups of data processing apparatuses switch between and input pieces of fault information from the first and second groups of data processing apparatuses (for example, see patent document 1).
[Patent Document 1] Japanese Laid-Open Patent Publication No. 01-050135

When a fault occurs during server operation, the fault information is mostly stored away to reduce the fault-handling time. The fault information, however, is not stored in some cases such as when a multiple fault occurs or because of a fault in a fault reporting path, an ASIC or F/W fault that is unpredictable at design time, etc.

The situations where fault information is not stored include an address fault occurring in a memory that is used by the F/W, and a fixed fault occurring in an area where processor information is saved.

SUMMARY

According to an aspect of the invention, an information processing apparatus includes: a hardware management unit that is connected with hardware resources assigned to a plurality of partitions by physical partitioning, manages the hardware resources, and if occurrence of a fault in any of the plurality of partitions is detected, makes a notification of the occurrence of the fault in a fault-occurring partition which is the partition where the fault occurs; and a partition management unit that is provided in each of the plurality of partitions and acquires fault information if in a physically partitioned state, if the occurrence of the fault is recognized based on the notification from the hardware management unit, if its own partition is not the fault-occurring partition, and if it is determined to be necessary to acquire the fault information, the fault information being information on the fault.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Hereinafter, an embodiment of the present invention will be described with reference to the drawings.

The present embodiment will deal with a server to which an information processing apparatus according to the present invention is applied.

Description will initially be given of the configuration of the server according to the present embodiment.

Figure 1:
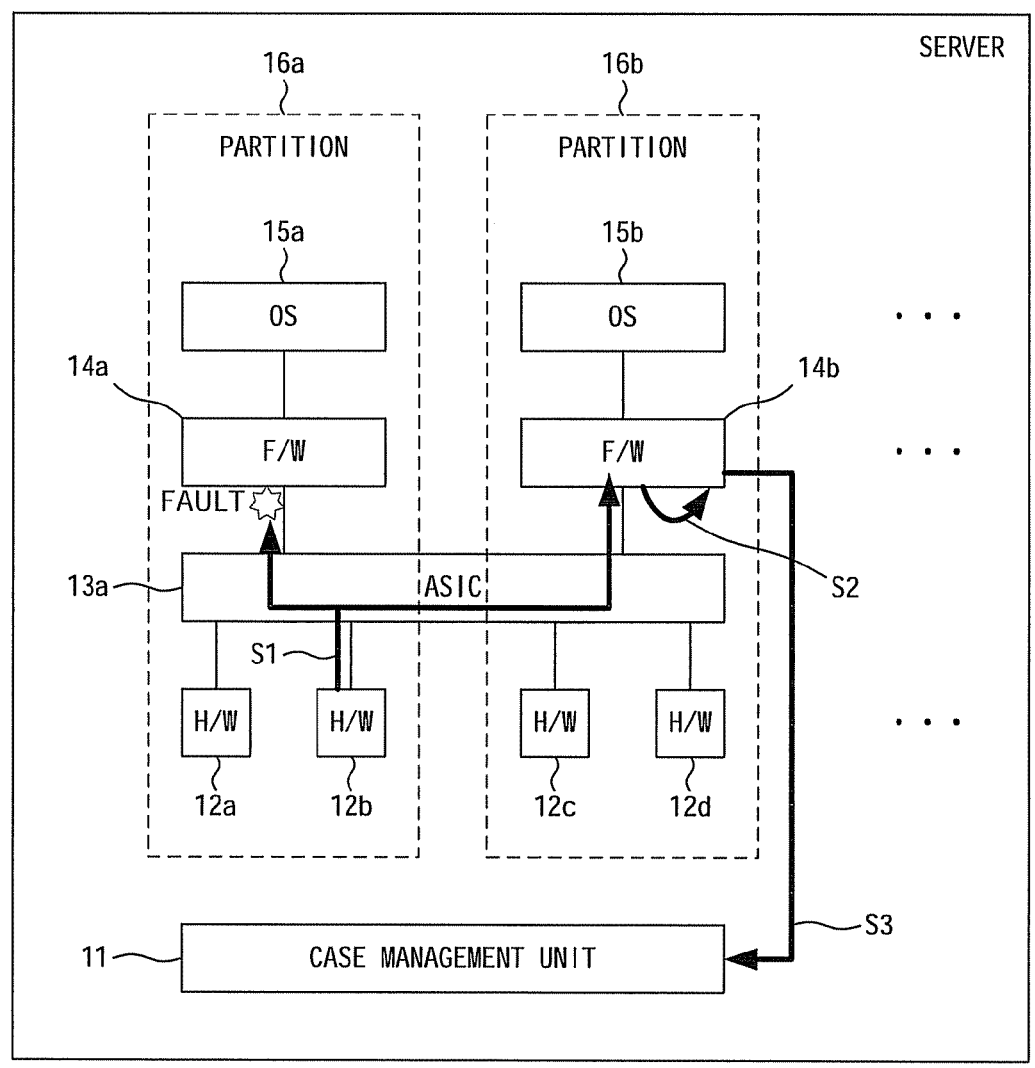
FIG. 1 is a block diagram illustrating an example of the configuration of a server according to the present embodiment.

FIG. 1 is a block diagram illustrating an example of the configuration of the server according to the present embodiment. The server includes a case management unit 11, H/Ws 12a, 12b, 12c, and 12d, an ASIC 13a, F/Ws 14a and 14b, and OSes 15a and 15b. Partitions 16a and 16b are created in the server. The OS 15a, F/W 14a, ASIC 13a, and H/Ws 12a and 12b are assigned to the partition 16a. The OS 15b, F/W 14b, ASIC 13a, and H/Ws 12c and 12d are assigned to the partition 16b. The F/Ws 14a and 14b and the OSes 15a and 15b are pieces of software running on the CPU of the server. A single piece of F/W and an OS run on each partition.

Information set in and fault information acquired from the H/Ws 12a, 12b, 12c, and 12d, which are divided by physical partitioning, are saved to a storage area of the managing ASIC 13a, and can be acquired from the F/Ws 14a and 14b without the intervention of any special program or hardware.

The ASIC 13a is a chip for performing communication control. Examples of the ASIC 13a include a North-Bridge that connects and controls a CPU, interfaces, and crossbars, an MLDS (Memory and Local Data Switch) that connects and controls memories, interfaces, and crossbars, and a South-Bridge that connects and controls I/O devices, buses, and crossbars.

The case management unit 11 can store server's fault information received from the F/Ws 14a and 14b, and output the fault information to outside in response to a request from the outside.

Next, an overview will be given of the operation of the server according to the present embodiment when a fault occurs.

In FIG. 1, S1 to S3 outline the operation of the server when a fault occurs.

(S1) When a fault occurs in the H/W 12a or 12b under its own management, the ASIC 13a notifies the content of the fault to all the partitions.

(S2) The F/Ws 14a and 14b determine the operating mode, and monitor the fault report for timeout if in physical partitioning.

(S3) When a timeout occurs, the F/Ws 14a and 14b acquire fault information on the opposite partitions of the ASIC 13a from the ASIC 13a, analyze the fault information, and make a notification to the case management unit 11. In the example of the diagram, the fault processing of the F/W 14a is interrupted due to a multiple fault on the side of the F/W 14a. Upon timeout, the F/W 14b acquires the fault information on the partition 16a from the ASIC 13a, analyzes the fault information, and makes a notification to the case management unit 11.

Next, description will be given in detail of the operation of the server according to the present embodiment when a fault occurs.

The storage area of the ASIC 13a contains operating mode information (operation information) that indicates being in physical partitioning mode, fault occurrence information that indicates whether or not a fault occurs, physical partition position information (position information) that indicates the position of the physical partition where the fault occurs, fault location information that indicates the location (position in the physical partition) where the fault occurs, fault detail information that indicates the details of the fault, release information that sets whether or not to release the hiding of fault information (fault location information, fault detail information) in response to an access from a different partition, and normal termination information that indicates whether or not fault processing has been terminated normally. The release information, the normal termination information, and the fault information are retained for each partition.

The ASIC 13a has the function of hiding fault information for the sake of avoiding malfunction and ensuring reliability and security. Under normal conditions, a flag on the release information is reset. If in this state the fault information on a certain partition stored in the ASIC 13a is accessed from other partitions, the hiding function returns predetermined data instead of the fault information. If the flag is set on the release information on a certain partition, the hiding is released and the fault information on the partition can be read from other partitions.

Figure 2:
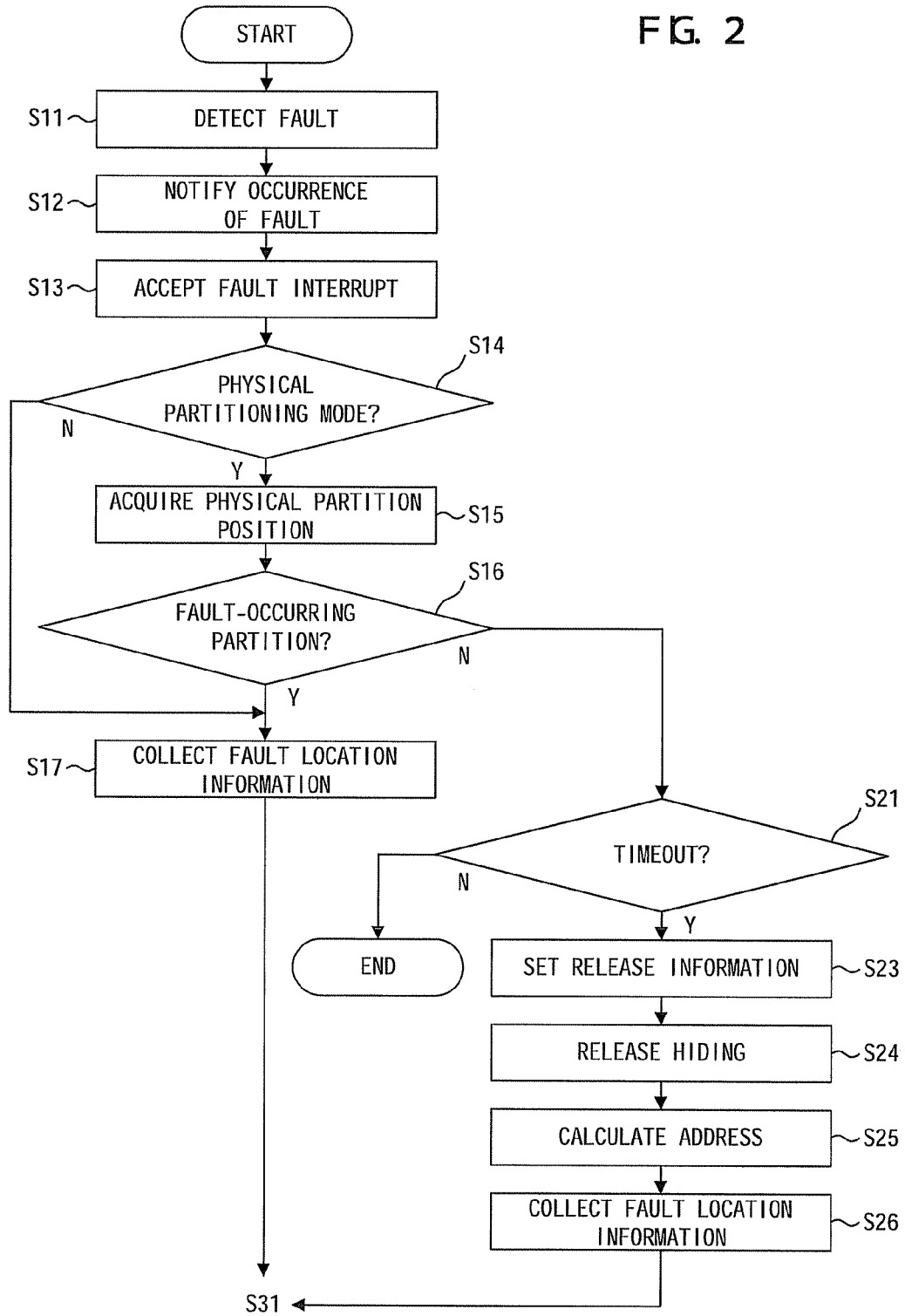
FIG. 2 is a flowchart illustrating a first operation of the server according to the present embodiment when a fault occurs.
Figure 3:
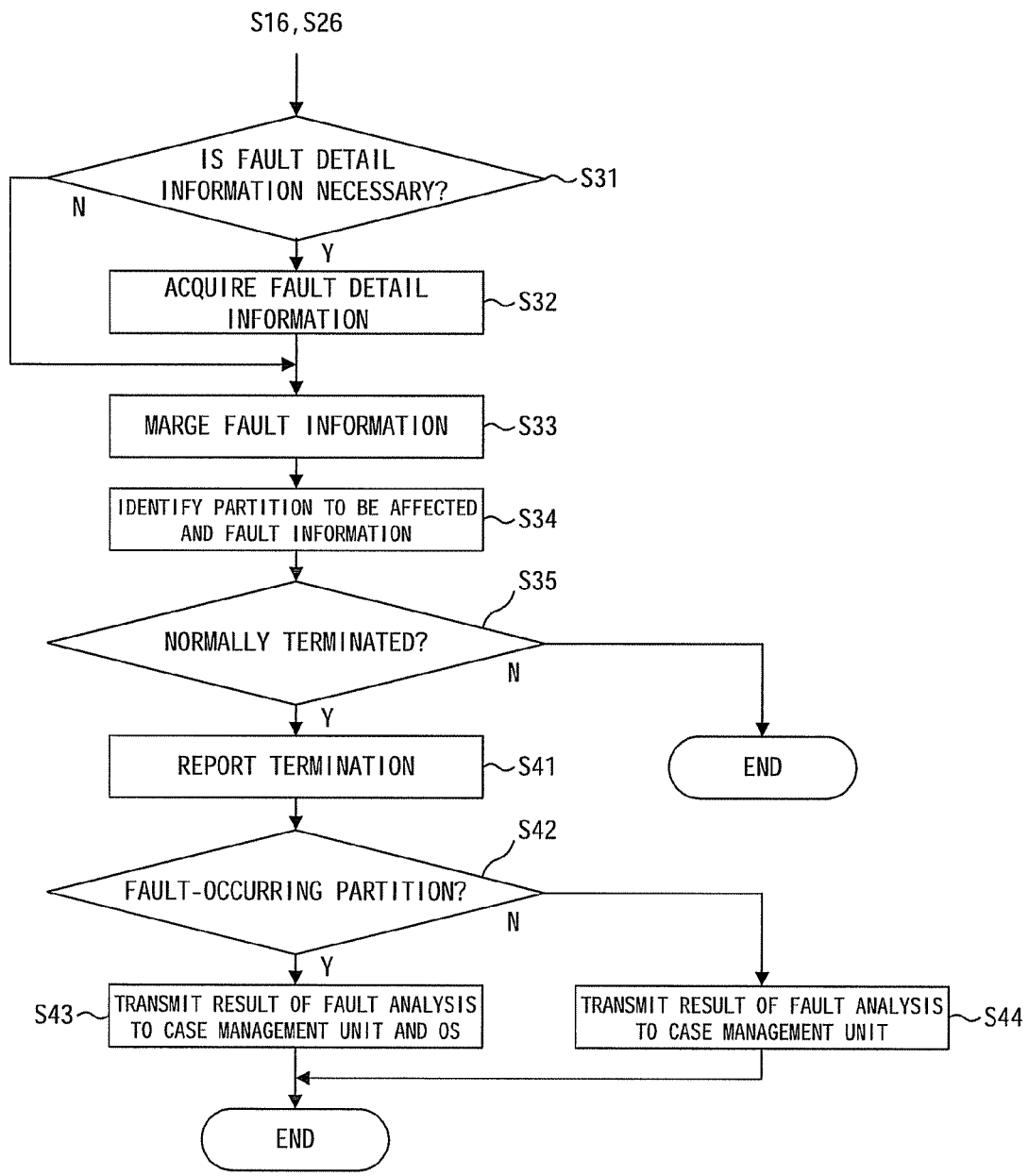
FIG. 3 is a flowchart illustrating a second operation of the server according to the present embodiment when a fault occurs.

FIG. 2 is a flowchart illustrating a first operation of the server according to the present embodiment when a fault occurs. FIG. 3 is a flowchart illustrating a second operation of the server according to the present embodiment when a fault occurs. Initially, the ASIC 13a detects a fault in a partition under its own management (S11). In the example of FIG. 1, a fault shall occur in the H/W 12b which pertains to the partition 16a. The ASIC 13a which manages the H/W 12b retains the fault information detected, and notifies (broadcasts) the occurrence of the fault to all the partitions 16a and 16b that are assigned to itself (S12). In the example of FIG. 1, the ASIC 13a sets a flag on the fault occurrence information, and records the position of the physical partition where the fault occurs (the H/W 12b in the partition 16a) into the physical partition position information.

Next, the F/Ws 14a and 14b accept a fault interrupt (S13). Here, the F/Ws 14a and 14b are monitoring the fault occurrence information in the ASIC 13a, and recognize the occurrence of a fault from the flag on the fault occurrence information. Next, the F/Ws 14a and 14b refer to the operating mode information in the ASIC 13a to determine whether in the physical partitioning mode or not (S14). If not in the physical partitioning mode (S14, N), the F/Ws 14a and 14b proceed to processing S16. If in the physical partitioning mode (S14, Y), the F/Ws 14a and 14b refer to the physical partition position information to recognize the partition where the fault occurs (fault-occurring partition) (S15), and determine whether or not their own partition is the fault-occurring partition (S16). In the example of FIG. 1, the F/Ws 14a and 14b recognize that the partition 16a is the fault-occurring partition.

If its own partition is the fault-occurring partition (S16, Y), the F/W 14a or 14b collects the fault location information on the partition from the ASIC 13a (S17), and proceeds to processing S31. In the example of FIG. 1, the F/W 14a that pertains to the fault-occurring partition collects the fault location information on the partition 16a.

If its own partition is not where the fault occurs (S16, N), the F/W 14a or 14b monitors the flag on the normal termination information on the other partition of the ASIC 13a for timeout, determining whether or not a timeout occurs (S21). In the example of FIG. 1, the F/W 14b that does not pertain to the fault-occurring partition monitors for timeout.

If no timeout occurs (S21, N), i.e., if the flag on the normal termination information on the fault-occurring partition of the ASIC 13a is set within a predetermined time, the procedure ends.

If a timeout occurs (S21, Y), the F/W 14a or 14b sets release information on the fault-occurring partition (S23). Here, the F/W 14a or 14b sets the flag on the release information, thereby requesting the ASIC 13a to release the hiding. With the flag set on the release information, the ASIC 13a releases the hiding of the fault information on the fault-occurring partition (S24). Next, the F/W 14a or 14b calculates the address of the fault information based on the physical partition position information and a predetermined calculation formula (S25), and collects fault location information from the ASIC 13a (S26). In the example of FIG. 1, the F/W 14b that does not pertain to the fault-occurring partition monitors the normal termination information on the fault-occurring partition for timeout. If a timeout occurs, the F/W 14b sets the flag on the release information on the partition 16a and collects the fault location information on the partition 16a.

Next, the F/W 14a or 14b determines whether or not fault detail information is necessary (S31). If the fault detail information is not necessary (S31, N), the F/W 14a or 14b proceeds to processing S33. If the fault detail information is necessary (S31, Y), the F/W 14a or 14b acquires the fault detail information corresponding to the fault location information acquired (S32). Next, the F/W 14a or 14b merges the pieces of fault information acquired (fault location information, fault detail information) (S33). The F/W 14a or 14b analyzes the fault information to identify the partition to be affected by the fault and fault information to affect (S34), and determines whether or not the fault analysis is normally terminated (S35).

If the fault analysis is not normally terminated (S35, N), the procedure ends. That the fault analysis is not normally terminated refers to such cases that the fault information cannot be collected due to a multiple fault. In the example of FIG. 1, the F/W 14a aborts fault processing due to a multiple fault, and no flag is set on the normal termination information on the partition 16a.

If the fault analysis is normally terminated (S35, Y), the F/W 14a or 14b reports the termination of the fault processing to the partition(s) other than that the F/W 14a or 14b itself pertains to within the range of the ASIC 13a to be affected (S41). Here, the F/W 14a or 14b sets the flag on the normal termination information on its own partition of the ASIC 13a, and the F/W of the other partition monitors the flag on the normal termination information to recognize the normal termination. In the example of FIG. 1, the F/W 14b sets the flag on the normal termination information on the partition 16b.

Next, the F/W 14a or 14b determines whether or not its own partition is the fault-occurring partition (S42). If its own partition is the fault-occurring partition (S42, Y), the F/W 14a or 14b transmits the result of the fault analysis to the case management unit 11 and the OS of its own partition (S43), and ends the procedure. If its own partition is not the fault-occurring partition (S42, N), the F/W 14a or 14b transmits the result of the fault analysis to the case management unit 11 (S44), and ends the procedure. Typically, the result of the fault analysis to be transmitted to the case management unit 11 is a report from the fault-occurring partition. The result of the fault analysis at the processing S43 is a report from a partition other than the fault-occurring partition, but is expressed as a report from the fault-occurring partition.

While the present embodiment has dealt with the case where the ASIC 13a performs H/W management on two partitions, the present invention may also be applied when performing H/W management on three or more partitions.

Now, the effect of the present embodiment will be described in conjunction with a specific example of physical partitioning and partitions.

Figure 4:
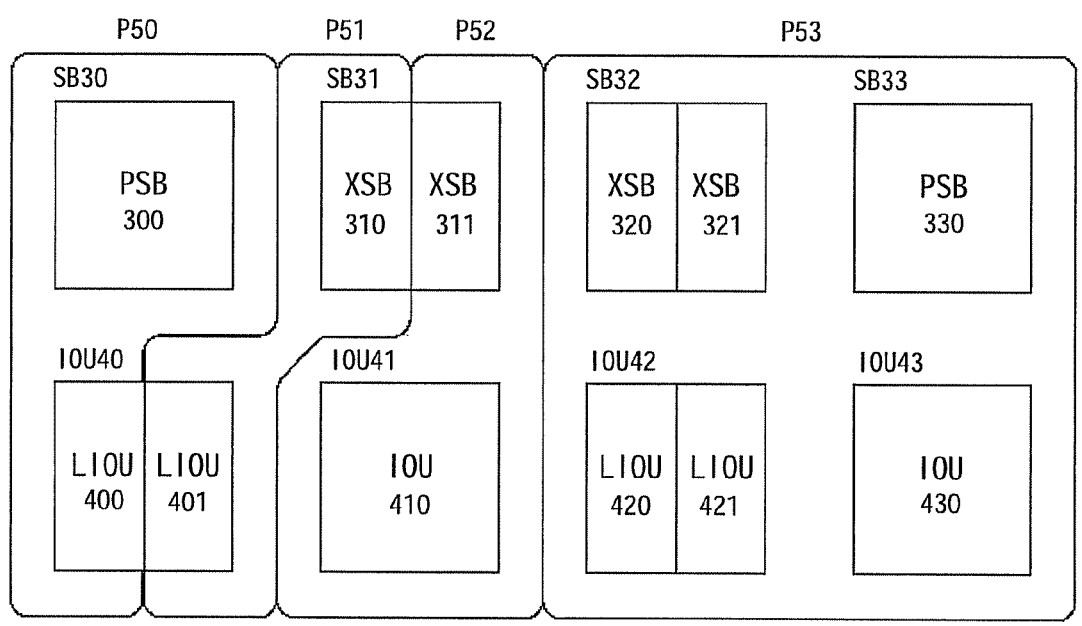
FIG. 4 is a block diagram illustrating an example of physical partitioning and the configuration of partitions in the server according to the present embodiment.

FIG. 4 is a block diagram illustrating an example of physical partitioning and the configuration of partitions in the server according to the present embodiment. In the diagram, the server includes system boards (SBs) 30, 31, 32, and 33, and IO units (IOUs) 40, 41, 42, and 43 as its hardware. Partitions (Ps) 50, 51, 52, and 53 are created. The SBs 30, 31, 32, and 33 include the foregoing ASIC each. A single piece of F/W and an OS run on each of the Ps 50, 51, 52, and 53.

The SBs 30 and 33 are not physically partitioned and are used as a single SB (PSB) 300 or 330 each. The SBs 31 and 32 are physically partitioned and are used as two divided SBs (XSBs) 310 and 311, and 320 and 321, respectively.

The IOUs 41 and 43 are not physically partitioned and are used as a single IOU 410 or 430 each. The IOUs 40 and 42 are physically partitioned and are used as two divided IOUs (LIOUs) 400 and 401, and 420 and 421, respectively.

The PSB 300 and the LIOU 400 are assigned to the P 50. The XSB 310 and the LIOU 401 are assigned to the P 51. The XSB 311 and the IOU 410 are assigned to the P 52. The XSBs 320 and 321, the PSB 330, the LIOUs 420 and 421, and the IOU 430 are assigned to the P 53.

If either one of the XSBs of the SB 31 suffers a fault that has an impact within the XSB, and the fault processing is not able to be continued for any reason, then the fault processing is continued in the partition to which the other XSB pertains. When a piece of hardware thus processes a fault other than in its own partition, it is possible to acquire and analyze the fault information because of the effect of the present embodiment.

If a fault occurs in either one of the XSBs of the SB 32, the P 53 to which the XSB pertains will go down. When physically-partitioned pieces of hardware thus pertain to an identical partition, the effect of the present embodiment will not be available.

According to the present embodiment, it is possible to acquire fault information and reduce fault-handling time even in situations where it has not been conventionally possible to acquire the fault information due to a multiple fault or the like.

It should be appreciated that the hardware management unit corresponds to the ASIC(s) of the embodiment. The partition management unit corresponds to the F/Ws of the embodiment. The fault information recording unit corresponds to the case management unit of the embodiment.

As has been described above, it is possible to improve the probability that fault information can be obtained when using the physical partitioning function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus comprising:
    a hardware management unit that is connected with hardware resources assigned to a plurality of partitions by physical partitioning, manages the hardware resources, and if occurrence of a fault in any of the plurality of partitions is detected, makes a notification of the occurrence of the fault in a fault-occurring partition which is the partition where the fault occurs; and
    a partition management unit that is provided in each of the plurality of partitions and acquires fault information if in a physically partitioned state, if the occurrence of the fault is recognized based on the notification from the hardware management unit, if its own partition is not the fault-occurring partition, and if it is determined to be necessary to acquire the fault information, the fault information being information on the fault.

2. The information processing apparatus according to claim 1, wherein
    the partition management unit analyzes the fault information acquired and outputs a result of the analysis as fault analysis information,
    the information processing apparatus further comprising a fault information recording unit that records the fault analysis information output by the partition management unit.

3. The information processing apparatus according to claim 2, wherein
the partition management unit analyzes the fault information, and outputs the fault analysis information as information output from the fault-occurring partition if its own partition is not the fault-occurring partition.

4. The information processing apparatus according to claim 1, wherein
the partition management unit determines that it is necessary to acquire the fault information if it is recognized that acquisition of the fault information in the fault-occurring partition is failed, the fault information being the information on the fault.

5. The information processing apparatus according to claim 4, wherein
the hardware management unit retains normal termination information that indicates whether or not the acquisition of the fault information is normally terminated; and
the partition management unit sets the normal termination information to a normal termination state when the partition management unit normally terminates the acquisition of the fault information.

6. The information processing apparatus according to claim 5, wherein
the partition management unit monitors the normal termination information if in the physically partitioned state, if the occurrence of the fault is recognized based on the notification from the hardware management unit, and if its own partition is not the fault-occurring partition; and
the partition management unit recognizes that the acquisition of the fault information in the fault-occurring partition is failed if the normal termination information does not indicate the normal termination state by predetermined time.

7. The information processing apparatus according to claim 1, wherein
the hardware management unit retains the fault information with respect to each of the partitions; and
the partition management unit acquires the fault information on the fault-occurring partition from the hardware management unit if in the physically partitioned state, if the occurrence of the fault is recognized based on the notification from the hardware management unit, if its own partition is not the fault-occurring partition, and if it is determined to be necessary to acquire the fault information.

8. The information processing apparatus according to claim 7, wherein
the hardware management unit hides the fault information on the fault-occurring partition from the other partition(s); and
the partition management unit makes the hardware management unit release the hiding and acquires the fault information if in the physically partitioned state, if the occurrence of the fault is recognized based on the notification from the hardware management unit, if its own partition is not the fault-occurring partition, and if it is determined to be necessary to acquire the fault information, the fault information being the information on the fault.

9. The information processing apparatus according to claim 1, wherein
the hardware management unit retains operation information that indicates whether or not physical partitions are created; and the partition management unit refers to the operation information to determine whether in the physically partitioned state or not.

10. The information processing apparatus according to claim 1, wherein
the hardware management unit retains a position of occurrence of the fault as position information; and
if the partition management unit recognizes the occurrence of the fault based on the notification from the hardware management unit, the partition management unit refers to the position information to determine whether or not its own partition is the fault-occurring partition.

11. The information processing apparatus according to claim 1, wherein
the partition management unit collects the information on the fault if the occurrence of the fault is recognized based on the notification from the hardware management unit and if its own partition is the fault-occurring partition.

12. The information processing apparatus according to claim 1, wherein
the hardware management unit retains fault occurrence information that indicates the presence or absence of occurrence of a fault, and sets the fault occurrence information to indicate the occurrence of a fault when the fault occurs in one of the plurality of partitions; and
the partition management unit monitors the fault occurrence information of the hardware management unit to recognize the occurrence of the fault.

13. A method of processing a fault of an information processing apparatus, the method comprising:
managing hardware resources assigned to a plurality of partitions by physical partitioning, and if occurrence of a fault in any of the plurality of partitions is detected,
making a notification of the occurrence of the fault in a fault-occurring partition which is the partition where the fault occurs;
acquiring fault information of a specific partition which is one of the plurality of partitions, if in a physically partitioned state, if the occurrence of the fault is recognized based on the notification, if the specific own partition is not the fault-occurring partition, and if it is determined to be necessary to acquire the fault information, the fault information being information on the fault.

14. The method of processing a fault according to claim 13, further comprising:
analyzing the fault information acquired and outputting a result of the analysis as fault analysis information with respect to each of the partitions; and
recording the fault analysis information.

15. The method of processing a fault according to claim 14, wherein
the analyzing analyzes the fault information, and outputs the fault analysis information as information output from the fault-occurring partition if the specific partition is not the fault-occurring partition.

16. The method of processing a fault according to claim 13, wherein
the acquiring determines it is necessary to acquire the fault information if it is recognized that acquisition of the fault information in the fault-occurring partition is failed, the fault information being the information on the fault.

17. The method of processing a fault according to claim 16, wherein
the managing retains normal termination information that indicates whether or not the acquisition of the fault information is normally terminated; and the acquiring sets the normal termination information to a normal termination state when the acquiring normally terminates the acquisition of the fault information.

18. The method of processing a fault according to claim 17, wherein the acquiring monitors the normal termination information if in the physically partitioned state, if the occurrence of the fault is recognized based on the notification, and if the specific partition is not the fault-occurring partition; and the acquiring recognizes that the acquisition of the fault information in the fault-occurring partition is failed if the normal termination information does not indicate the normal termination state by predetermined time.

19. The method of processing a fault according to claim 1, wherein the managing retains the fault information with respect to each of the partitions; and the acquiring acquires the fault information on the fault-occurring partition if in the physically partitioned state, if the occurrence of the fault is recognized based on the notification, if the specific partition is not the fault-occurring partition, and if it is determined to be necessary to acquire the fault information.

20. The method of processing a fault according to claim 19, wherein the managing hides the fault information on the fault-occurring partition from the other partition(s); and the acquiring release the hiding and acquires the fault information if in the physically partitioned state, if the occurrence of the fault is recognized based on the notification, if the specific partition is not the fault-occurring partition, and if it is determined to be necessary to acquire the fault information, the fault information being the information on the fault.

* * * * *